(12) United States Patent
Arai et al.

(10) Patent No.: US 7,084,084 B2
(45) Date of Patent: Aug. 1, 2006

(54) HIGHLY DURABLE SILICA GLASS, PROCESS FOR PRODUCING SAME, MEMBER COMPRISED THEREOF, AND APPARATUS PROVIDED THEREWITH

(75) Inventors: Kazuyoshi Arai, Yokohama (JP); Tsutomu Takahata, Yokohama (JP); Shinkichi Hashimoto, Sagamihara (JP); Hideaki Kiriya, Atsugi (JP); Yoshinori Harada, Sagamihara (JP)

(73) Assignees: Tosoh Corporation, Yamaguchi (JP); Tosoh Quartz Corporation, Yamagata (JP); Tosoh SGM Corporation, Yamaguchi (JP)

( * ) Notice: Subject to any disclaimer, the term of this patent is extended or adjusted under 35 U.S.C. 154(b) by 23 days.

(21) Appl. No.: 10/383,682

(22) Filed: Mar. 10, 2003

(65) Prior Publication Data

US 2003/0176269 A1 Sep. 18, 2003

(30) Foreign Application Priority Data

Mar. 11, 2002 (JP) ............................... 2002-065314
Mar. 11, 2002 (JP) ............................... 2002-065315
Mar. 11, 2002 (JP) ............................... 2002-065316

(51) Int. Cl.
*B01J 19/02* (2006.01)
*C03C 3/95* (2006.01)

(52) U.S. Cl. ........................... 501/64; 501/68; 422/240
(58) Field of Classification Search ................ 501/54, 501/64, 68, 72; 422/240
See application file for complete search history.

(56) References Cited

U.S. PATENT DOCUMENTS

| | | | |
|---|---|---|---|
| 3,978,362 A * | 8/1976 | Dumbaugh, Jr. et al. ..... | 501/70 |
| 4,122,042 A * | 10/1978 | Meden-Piesslinger et al. ............................ | 252/513 |
| 4,180,618 A | 12/1979 | Alpha et al. | |
| 4,634,684 A * | 1/1987 | Dumbaugh, Jr. .............. | 501/69 |
| 4,839,313 A * | 6/1989 | Kondo et al. ................... | 501/14 |
| 4,940,678 A * | 7/1990 | Aitken ........................ | 501/73 |
| 5,326,730 A | 7/1994 | Dumbaugh et al. | |
| 5,854,151 A * | 12/1998 | Fukuoka ....................... | 501/68 |
| 6,136,736 A * | 10/2000 | Rajaram et al. ............... | 501/54 |
| 6,447,937 B1 * | 9/2002 | Murakawa et al. .......... | 428/696 |
| 6,579,636 B1 * | 6/2003 | Oguri et al. ................. | 428/697 |
| 2001/0056029 A1 * | 12/2001 | Kanamaru et al. ............. | 501/56 |
| 2002/0009560 A1 * | 1/2002 | Ozono ........................ | 428/34.4 |

FOREIGN PATENT DOCUMENTS

| | | |
|---|---|---|
| EP | 0 220 818 A | 5/1987 |
| EP | 0 672 629 A | 9/1995 |
| JP | 06-171974 A | 6/1994 |
| JP | 06-238342 A | 8/1994 |
| WO | WO 0 230 840 A | 4/2002 |

OTHER PUBLICATIONS

Clayden N J et al, "Solid state Al NMR and FTIR study of lanthanum aluminosilicate glasses" *Journal of Non-crystalline solids*, vol. 258, No., 1-3, pp., 11-19, Nov. 1999, No. XP004364333-.

Shelby J E et al, "Formation and Properties of Yttrium Aluminosilicate Glasses" *Physics and Chemistry of Glasses, Society of Glass Technology*, vol. 33, No., 3, pp. 93-98, Jun. 1, 1992, No. XP000275459-.

Sin-Lung Lin et al, "Properties of CE02-AL203 Glasses Prepared In An Atmosphere of Nitrogen" *Journal of the Ceramic Society of Japan*, vol. 103, No. 12, pp. 1196-1200, Dec. 1, 1995, No. XP000625996.

* cited by examiner

*Primary Examiner*—David Sample
(74) *Attorney, Agent, or Firm*—Sughrue Mion, PLLC

(57) ABSTRACT

Highly durable silica glass comprising silica having incorporated therein aluminum and at least one element (M) selected from group 2A elements, group 3A elements and group 4A elements of the periodic table. Preferably, the sum of aluminum and element (M) is at least 30 atomic % based on the amount of total metal elements in the silica glass, and the atomic ratio of aluminum to element (M) is in the range of 0.05 to 20.

The silica glass has a high purity and exhibits enhanced durability while good processability and machinability, and reduced dusting property are kept, and the glass is suitable for members of a semiconductor production apparatus or liquid crystal display production apparatus using a halogenated gas and/or its plasma.

9 Claims, 6 Drawing Sheets

HIGHLY DURABLE SILICA GLASS, PROCESS FOR PRODUCING SAME, MEMBER COMPRISED THEREOF, AND APPARATUS PROVIDED THEREWITH

BACKGROUND OF THE INVENTION (1) Field of the Invention

This invention relates to highly durable silica glass, a process for producing the silica glass, a member comprised of the silica glass, and an apparatus provided with the member.

The silica glass of the present invention has enhanced durability, and good processability and machinability, and therefore, a member comprised of the silica glass is suitable for apparatuses using a plasma, such as a semiconductor-producing apparatus and a liquid crystal-producing display apparatus.

(2) Description of the Related Art

In fields of production of semiconductor or liquid crystal, production apparatuses using a plasma are widely used. In recent years, semiconductor integrated circuits have become minute, and hence, a dry-etching step using a plasma bears importance. In the dry-etching step, a halogenated gas such as fluorine-containing gas or chlorine-containing gas is used.

The halogenated gas and its plasma have a high reactivity and thus are utilized in various steps, for example, as an etching gas in an etching stop or cleaning gas in heat CVD step. The halogenated gas used includes, for example, fluorine-containing gases such as $F_2$, HF, $CF_4$, $C_2F_6$, $C_3F_8$, $C_4F8$, $CHF_3$, $SF_6$ and $NF_3$; chlorine-containing gases such as $Cl_2$, HCl, $BCl_3$ and $CCl_4$; and bromine-containing gases such as $Br_2$ and HBr. In recent years, gases having a low globe-warming factor, such as $C_5F_8$ and $C_4F_6$, have been proposed (For example, Toru Ida et al: Semi-Con., Japan 2002, NAVIGATOR, p39–49, 2002).

Inside the semiconductor production apparatus and liquid crystal display production apparatus, a silica glass member is provided. This is because silica glass has a high-frequency transmittance which is important for plasma generation, and silica glass can be shaped into a member of a complicated shape with high purity at a low production cost. The reason for which silica glass member of a complicated shape can be produced at a low cost, is that a rock crystal powder of a high purity used as a raw material for silica glass is inexpensive, and further that it has good processability and machinability, i.e., machining can be easily carried out and oxyhydrogen flame-welding can be conducted.

Silica glass has good characteristics, as mentioned above, but has problems. That is, a surface of a silica glass member is gradually etched and eroded by a halogenated gas or its plasma at the exposed location. This undesirable etching reduces the durability of the silica glass member and sometimes causes abnormal discharge.

To remedy the above-mentioned problems, it was proposed that the members to be exposed to a plasma are composed of a sintered body exhibiting enhanced resistance to etching. Such a sintered body includes, for example, a sintered alumina body exhibiting a lower etching rate when exposed to a plasma, than that of silica glass, was proposed. (Japanese Unexamined Patent Publication [hereinafter abbreviated to "JP-A"] H5-217946), a sintered body comprising yttrium-aluminum-garnet (JP-A H10-236871), and a sintered aluminum nitride body (JP-A H10-275524). However, these sintered bodies have problems such that a raw material with a high purity is difficult to prepare, and, they have a grain boundary and therefore, when the sintered body is etched, the particles are liable to be separated from the sintered body with the result of reduction in yield of semiconductors or liquid crystal displays. Further, they have poor processability and machinability, and the produced members are costly.

An attempt of adding a corrosion resistant element in silica glass is made to reduce the undesirable etching caused by a plasma while the good properties inherently possessed by silica glass, such as high purity, low cast, good processability and low dusting property are kept. More specifically, an attempt is made of adding an element in silica glass, a halide of which has a sublimation temperature or a boiling point higher than that of a halide of silica contained in the silica glass, whereby a silica glass composition exhibiting a reduced etching rate is provided.

For example, a proposal was made of incorporating a metal in silica glass, fluoride of which metal has a boiling point higher than that of fluoride of silica, whereby a silica glass composition containing bubbles and foreign matter in amounts such that the projected area of glass is smaller than 100 mm$^2$ per 100 cm$^3$ is provided (JP-A 2002-137927).

A proposal was made of incorporating in silica glass at least one metal element selected from Sm, Eu, Yb, Pm, Nd, Ce, Tb, Gd, Ba, Mg, Y, Tm, Dy, Ho, Er, Cd, Co, Cr, Cs, Zr, Al, In, Cu, Fe, Bi, Ga and Ti, to provide a silica glass composition containing bubbles and foreign matter in amounts such that the projected area of glass is smaller than 100 mm$^2$ per 100 cm$^3$, and having a OH concentration of 100 to 2,000, a surface roughness of 0.01 to 10 μm, and a gas emission of at least 2 mol/m$^3$ as measured when the temperature is elevated from room temperature to 1,000° C. (JP-A 2002-193634).

However, the inventors have found that the addition of the above-mentioned anticorrosive elements exerts a function of lowering the etching rate, but tends to destroy the structure of silica glass which offsets the durability enhancement function performed by the addition of corrosive elements. The reason for which the structure of silica glass tends to be destroyed is believed that the $SiO_2$ network constituting silica glass is broken by the incorporation of secondary elements, and consequently, non-crosslinking oxygen having a weak bonding force is introduced. This undesirable phenomenon occurs remarkably under etching conditions in which incidence of ion with high energy occurs markedly. Thus it was possible that, by the addition of secondary elements, the etching rate of silica glass is rather increased and the durability is reduced.

As a solution of the above-problem, a glass composition composed of $SiO_2$—$Al_2O_3$—CaO, $siO_2$—$Al_2O_3$—MgO, $SiO_2$—BaO—CaO or $SiO_2$—$ZrO_2$—CaO or $SiO_2$—$TiO_2$—BaO was proposed (for example, JP-A 2002-121047). These proposed glass compositions are not advantageous because these contain repellent elements for the semiconductor production such as Mg and Ca or toxic elements such as Ba.

As another solution, a glass composition composed of $Nd_2O_3$—$SiO_2$—$Al_2O_3$ or $Dy_2O_3$—$SiO_2$—$Al_2O_3$CaO was proposed (for example, Japanese Patent No. 3261044). These proposed glass compositions also are not advantageous because an expensive raw material such as Nd or Dy is used in a large amount and these glass compositions are generally difficult to vitrify.

A further solution was proposed wherein a silica glass composition comprising 0.1 to 20% by weight of a combination of a first metal element selected from Group 3B elements of the Periodic Table with a second element selected from Zr, Y, and lanthanoid and actinoid elements (for example, JP-A 2002-220257). This glass composition has a problem such that, when a large amount of elements are added, cracks, bubbles and turbidity tend to occur, although glass state (i.e., amorphous structure) can be kept.

SUMMARY OF THE INVENTION

An object of the present invention is to provide silica glass with high purity exhibiting enhanced durability while good processability and machinability, and reduced dusting property are kept, and suitable for members of a semiconductor production apparatus or liquid crystal display production apparatus using a halogenated gas and/or a plasma thereof.

Another object of the present invention is to provide highly durable silica glass having substantially no bubbles inside the glass and cracks, and exhibiting enhanced resistance to a halogenated gas and/or a plasma thereof.

Still another object of the present invention is to provide highly durable silica glass which is substantially transparent to visible light.

A further object of the present invention is to provide a member composed of the above-mentioned highly durable silica glass and suitable for a semiconductor production apparatus or a liquid crystal display production apparatus.

A further object of the present invention is to provide a semiconductor production apparatus or a liquid crystal display production apparatus, which is provided with a member composed of the above-mentioned highly durable silica glass.

In accordance with the present invention, there is provided highly durable silica glass comprising silica, aluminum and at least one element (M) selected from the group consisting of group 2A elements, group 3A elements and group 4A elements of the periodic table, which element (M) is hereinafter referred to as merely "element (M)" when appropriate.

Preferably, the sum of aluminum and element (M) is at least 30 atomic % based on the amount of total metal elements in the silica glass, and the atomic ratio of aluminum to element (M) is in the range of 0.05 to 20.

DETAILED DESCRIPTION OF THE PREFERRED EMBODIMENTS

Figure 1:
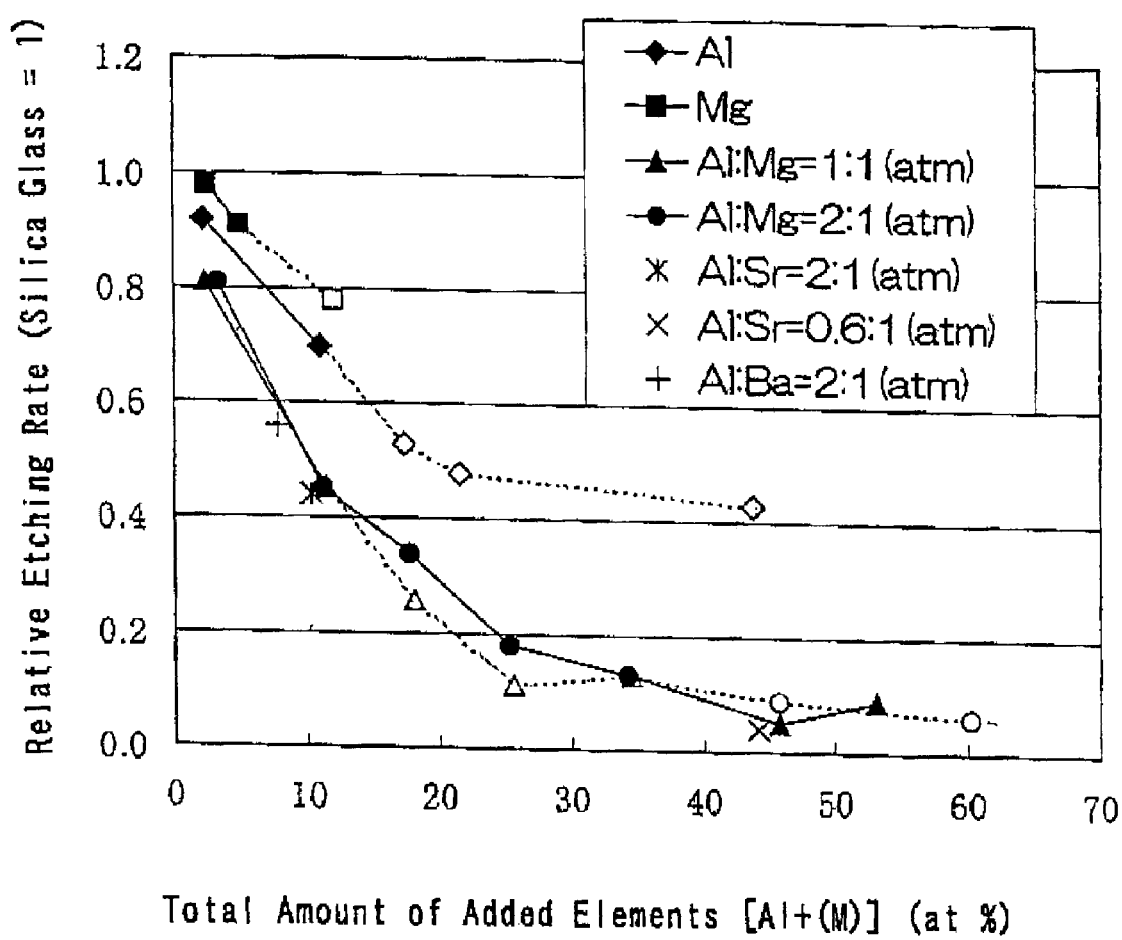
FIG. 1 is a graph showing a relationship between the total amount of aluminum and element (M) [Al+(M)] and a relative etching rate of added element-containing silica glass as expressed as the etching rate of silica glass is 1.

The highly durable silica glass of the present invention comprises silica, aluminum and at least one element (N) selected from group 2A elements, group 3A elements and group 4A elements of the periodic table.

Features of the Invention and Functions

First, functions of aluminum and element (M) added to silica glass will be explained.

Aluminum and element (M) exhibit a synergistic action of reducing the amounts of non-crosslinking oxygen and aluminum atoms not having a function of constituting a network in silica glass, and enhancing the resistance to a halogenated gas and/or its plasma.

More specifically halides of aluminum and halides of element (M) have a boiling point and sublimation temperature, which are higher than a boiling point and sublimation temperature of compound $SiX_4$ (X is a halogen atom). Therefore, the rate of etching caused by a halogenated gas and/or its plasma is far smaller than the rate of etching in silica glass not having aluminum and element (M) incorporated therein. Consequently, oxides and/or halides of aluminum and element (M) are condensed on the surface of silica glass. The condensed oxides and halides exert a protective action and thus enhance the resistance to a halogenated gas and/or its plasma.

In contrast, it is known that, in the case when element (M) is incorporated alone in silica glass, element (M) is present as a cation within the silica glass, and, to keep electrical neutrality, the $SiO_2$ network is broken and non-crosslinking oxygen is weakly bonded with the cation. The bonding of non-crosslinking oxygen with the cation has a weak bonding force, i.e., two- or three-tenths of that of Si—O bond in the $SiO_2$ network. Thus the formation of weakly bonded non-crosslinking oxygen is believed to reduce the durability of silica glass.

In the case when aluminum is incorporated alone in silica glass, aluminum atoms, which have a small ion radius, are taken into the $SiO_2$ network and substitute Si atoms in the oxygen four-coordinate position to form an Al—O bond (four-coordinated aluminum) having a relatively strong bonding force. However, the number of valency of aluminum is smaller by one than that of Si, and thus, the $SiO_2$ network is charged with negative electricity. Therefore, to keep electrical neutrality over the entirety of silica glass, part of Al atoms cannot be introduced into the $SiO_2$ network and are expelled from the $SiO_2$ network wherein oxygen is relatively weakly bonded.

Another part of Al atoms is believed to form a non-crosslinking oxygen as also observed when an element of group 4A of the periodic table is added.

Under etching conditions such that physical etching by ion incidence as well as chemical etching by radical contribute to a significant extent, it is believed that the above-mentioned weak bond tends to reduce the resistance of silica glass to a plasma.

The inventors showed that the formation of non-crosslinking oxygen can be suppressed by an electric charge compensation method, i.e., by compensating a positive electric charge occurring due to the addition of element (M) with a negative electric charge occurring due to aluminum having substituted Si forming the $SiO_2$ network. That is, it was demonstrated that, when element (M) is added in combination with aluminum, the $SiO_2$ network is repaired or stabilized by the synergistic effect of the two ingredients, and consequently, the resistance to a plasma can be drastically enhanced as compared with the case when one of the two ingredients is added.

With an increase in concentration of aluminum and element (M) in silica glass, the resistance to a halogenated gas and its plasma increases. It is to be noted that, when one of the two ingredients is added, there is a limit for the concentration to which the ingredient can be added while an amorphous state is maintained. For example, in the case where aluminum is added by an electrical melting method widely adopted for glass production, a peak showing the presence of a crystal appears in an X-ray diffraction pattern when the amount of aluminum added reaches about 15 atomic % based on Si. In the case where element (M) is added in a similar manner, a peak showing the presence of a crystal appears in an X-ray diffraction pattern when the amount of element (M) added reaches about 3 to 15 atomic % based on Si, although the limiting concentration varies depending upon the particular kind of element (M). The presence of crystal structure in silica glass causes, for example, cracks at a machining step, and generation of particles at an etching step.

In contrast, in the case where aluminum and element (M) are added in combination, the solubility of these ingredients in silica glass increases to a great extent. Thus, the addition of the two ingredients according to the present invention is beneficial in view of an increase in concentration of these ingredients in glass leading to enhancement of the resistance to a plasma.

However, it is to be noted that, when the amounts of aluminum and element (M) are increased to an extent such that the total amount of [Al+(M)] is in the range of about 15 to 20 atomic % based on Si, cracks and visible bubbles are produced in a large amount although a glass state, i.e., an amorphous state is maintained. That is, even in the case where the silica glass composition is within a glass range, practically acceptable glass is sometimes difficult to obtain. It is presumed that the structure of glass varies in a non-continuous manner when the amount of aluminum and element (M) is gradually increased.

It has been found that, when the sum of amounts of aluminum and element (M) [Al+(M)] is at least 30 atomic %, preferably at least 40 atomic %, based on the amount of total metal elements, a highly durable silica glass substantially having no cracks and visible bubbles can be obtained.

In the case when element (M) is at least one element selected from group 3A elements of the periodic table, and, the highly durable silica glass has a composition falling within a hexagon formed by drawing lines connecting six points: 70:20:10, 50:20:30, 30:40:30, 30:50:20, 45:50:5 and 70:25:5 in the triangular diagram of three-components Si—Al—M, especially good highly durable silica glass substantially having no cracks and visible bubbles can be obtained.

Preferably the highly durable silica glass of the present invention is substantially free from bubbles for a desired transparency, and more specifically, it has an optical transmittance of at least 80% as measured by irradiating a specimen having a thickness of 10 mm with light having a wavelength of 400 to 700 nm.

If only element (M) is incorporated in silica glass, the resulting glass is usually white and turbid, and opaque. It is presumed that, by the addition of element (M), fine bubbles are formed within the glass and a phase separation occurs, and thus, incident light irregularly reflects. The presence of fine bubbles and the phase separation undesirably cause nonuniform etching and generation of particles. In contrast, when element (M) is added in combination with aluminum, transparent glass can be obtained with a broad range of glass compositions. The transparent silica glass is suitable for, for example, a viewing window of semiconductor production apparatus or other apparatus.

It has been found that the formation of fine bubbles and the phase separation tend to occur in a region of composition or in the proximity thereof, at which $SiO_2$ and element (M) are immiscible with each other. Therefore, the formation of fine bubbles and the phase separation can be avoided by adopting a composition apart from the immiscible region of composition. More specifically, a composition can be adopted such that the atomic ratio of aluminum to element (M) is large, or the sum of the amounts of aluminum and element (M) is large.

Element (M)

Element (M) used in the present invention is not particularly limited provided that it is selected from group 2A elements, group 3A elements and group 4A elements of the periodic table. Element (M) may be used either alone or as a combination of at least two thereof.

Among the group 2A elements, group 3A elements and group 4A elements, fluorides of the group 4A elements have a boiling point higher and stability poorer than those of fluorides of the group 2A elements and group 3A elements, and thus, their erosion resistance-enhancing effect is relatively low. Group 2A elements give a chemical compound in Al—(2A)—Si—O system and thus are capable of being crystallized at a high temperature. Therefore, group 3A elements are preferable among the elements of the three groups.

As specific examples of group 2A elements, there can be mentioned Be, Mg, Ca, Sr, Ba and Ra. Of these, Mg, Ca, Sr and Ba are preferable. Sr is especially preferable because it has a relatively large ion radius and a small mobility, and therefore does not exert a bad influence on a semiconductor element, and it has no toxicity.

As specific examples of group 3A elements, there can be mentioned So, Y, La, Ce, Pr, Nd, Pm, Sm, Eu, Gd, Tb, Dy, Ho, Er, Tm, Yb and Lu. Of these, Y, La and Ce are preferable in view of low cost. La and Ce are especially preferable. La is most preferable because of no absorption in the visible wavelength range.

When aluminum and La as element (M) are used in combination, it is preferable that the sum (Al+La) of the amount of aluminum and the amount of La is in the range of 45 to 65 atomic % based on the amount of total metal elements, and the atomic ratio (Al/La) of aluminum to La is in the range of 1.5 to 3.

As specific examples of group 4A elements, there can be mentioned Ti, Zr and Hf. Of these, Ti and Zr are preferable in view of low cost.

It is presumed that the synergistic effect achieved by the addition of aluminum and element (M) is most prominently manifested when the atomic ratio of aluminum to element (M) is n/l, provided that the valency of element (M) is "n", in view of the balance of electric charges. However, as is observed generally in the production process of glass, the dispersibility of added ingredients vary depending upon the particular production conditions such as melting temperature, melting time and cooling time, and the particular rate of diffusion in silica glass. The inventors have found that a good synergistic effect can be achieved generally when the atomic ratio of aluminum to element (M) is in the range of 0.05 to 20, although the best ratio varies depending upon the production conditions and the kind of element (M).

The melt occurrence temperature of a three-oxides composition $SiO_2$—$Al_2O_3$-element (M) greatly varies depending upon the particular composition. Especially the minimum melt occurrence temperature varies depending upon the kind of element (M), and, as the composition becomes apart from the composition at the minimum melt occurrence temperature, the temperature at which the composition is completely molten becomes high and vitrification becomes difficult. For example, in the case where element (M) is at least element selected from group 2A elements of the periodic table, vitrification can be achieved easily when the atomic ratio of Al to element (M) is in the range of 0.1 to 5. In the case where element (M) is at least element selected from group 3A elements of the periodic table, vitrification can be achieved easily when the atomic ratio of Al to element (M) is in the range of 0.5 to 10, preferably 1 to 6.

However, vitrification can be achieved even with silica glass composition other than the above-mentioned composition, provided that a sufficiently high temperature and a cooling rate necessary for vitrification are adopted.

The highly durable silica glass of the present invention is preferably substantially free from metal impurities which are other than Si, O, Al and element (M). More specifically the content of each metal selected from Na, Fe and Cu is preferably not larger than 1 ppm. Therefore, a raw material powder used for the production of the highly durable silica glass of the present invention is preferably of high purity.

Process for Producing Highly Durable Silica Glass

The process for producing the highly durable silica glass of the present invention will be described below, but it should not be limited thereto.

The raw materials used are compounds each containing aluminum, element (M) or Si, and are usually powdery. As specific examples of the raw materials, there can be mentioned oxide and nitrate salt for an aluminum raw material; oxide, carbonate salt and nitrate salt for element (M) raw material; and quartz powder for St raw material. A compound containing both of aluminum and element (M) can be used. This compound is preferable because it exhibits prominently a synergistic effect achieved by the two ingredients.

The method of vitrification includes, for example, an electrical melting method, a plasma melting method and an oxyhydrogen flame melting method. Of these, an electrical melting method is preferable because this method can be adopted for a broad range of compositions including the silica glass composition exhibiting a high viscosity at a high temperature and the production apparatus used therefor is advantageous.

More specifically the highly durable silica glass is produced as follows. In one method, powdery oxide or powdery carbonate salt of element (M) and oxide of aluminum are placed together with powdery quartz in a vessel and thoroughly stirred to be thereby uniformly mixed together. The mixture is then melted by an electrical melting method or an oxyhydrogen flame melting method. Preferably an electrical melting method is adopted.

In another method, oxide or carbonate salt of element (M), oxide of aluminum, and powdery quartz are placed in a vessel together with a solvent such as ethanol, and then the solvent is evaporated while the mixture is thoroughly stirred. By this method, oxide or carbonate salt of element (M) and oxide of aluminum are deposited on particles of quartz. Thereafter the quartz is melted by an electrical melting method or an oxyhydrogen flame melting method, preferably by an electrical melting method.

In a still another method, nitrate salt of element (M) and nitrate salt of aluminum are dissolved in a solvent such as water, powdery quartz is added into the thus-obtained solution, and then, the solvent is evaporated while the solution is thoroughly stirred whereby the nitrate salts of added elements are deposited on particles of quartz. Thereafter the quartz is melted by an electrical melting method or an oxyhydrogen flame melting method, preferably by an electrical melting method.

The thus-prepared silica glass is preferably substantially vitreous, but crystallite may be present.

The silica glass is preferably dense and does not have grain boundary nor contain bubbles. Undesirable erosion by a halogenated gas and/or its plasma is liable to occur prominently at grain boundaries and sites at which bubbles are present. Further, the presence of grain boundaries and bubbles leads deterioration of mechanical strengths of the silica glass.

The highly durable silica glass may have incorporated therein minor amounts of auxiliary elements other than aluminum and element (M), such as a compatibility enhancing agent for improving compatibility between the added elements and silica glass, and a binder used for press-molding. The binder for press-molding may be an organic resin such as acrylic resin.

Highly Durable Silica Glass Member

The highly durable silica glass member of the present invention is comprised of the above-mentioned silica glass comprising silica, aluminum and element (M).

This silica glass member exhibits an enhanced durability and is suitable as an inner member provided within an apparatus using a halogenated gas and/or its plasma, such as a semiconductor production apparatus or a liquid crystal display production apparatus. By the term "inner member" used herein we mean a member which is contacted with a halogenated gas and/or its plasma within the apparatus.

More specifically the silica glass member of the present invention is advantageously used in an apparatus having a reaction vessel provided therein, such as a semiconductor production apparatus or a liquid crystal display production apparatus, into which a halogenated gas is introduced and in which a plasma is generated by applying a high frequency or a microwave. The silica glass member is especially suitably used in a dry etching apparatus wherein a conventional silica glass member is usually eroded to a great extent.

The silica glass member exhibits a corrosion rate of not larger than 0.5, more preferably not larger than 0.1, as measured in a halogenated gas and/or its plasma and as expressed as the corrosion rate of silica glass having not incorporated therein aluminum and element (M) being 1.

As specific examples of the halogenated gas, there can be mentioned fluorine-containing gases such as $F_2$, HF, $CF_4$, $C_4F_8$, $CHF_3$, $NF_3$ and $SF_6$: chlorine-containing gases such as $Cl_2$, HCl, $BCl_3$ and $CCl_4$; and bromine-containing gases such as $Br_2$ and HBr.

The silica glass member of the present invention is eroded by these halogenated gasses and/or their plasma only to a reduced extent and exhibits an enhanced durability. This is due to the synergistic effect achieved by the addition of aluminum and element (M). Halides of alumina or halides of element (M) have a boiling point or a sublimation temperature which are higher than those of $SiX_4$ (X is a halogen element). This means that the etching rate of aluminum and element (M) as observed when they are exposed to a halogenated gas and/or its plasma is smaller than that of silica glass not having aluminum and element (M). Namely in an etching step, an oxide or a halide of the added alumina and element (M) is concentrated on the surface of silica glass and the concentrated product functions as a protective film and enhances the resistance of the silica glass to the halogenated gas and/or its plasma. Further the synergistic effect by the addition of the two ingredients contributes the repair and/or stabilization of the SiO₂ network which also leads to enhancement of the resistance to a plasma. These advantageous functions are developed even when the silica glass is eroded by the use over a long period of time. Therefore the durability of the silica glass member of the present invention is much larger than that achieved by forming protective films of compounds of the added elements on the surface of silica glass.

The surface configuration of the silica glass member of the present invention provided in a semiconductor production apparatus and/or a liquid crystal production apparatus is not particularly limited. However, if the surface thereof is rough, the silica glass member tends to be subject to erosion. Therefore, at least parts of the member which are subject to erosion are preferably abraded or polished, for example, by fire polishing to reduce the surface roughness.

EXAMPLES

The invention will now be specifically described by the following examples that by no means limit the scope of the invention.

Example 1

Particles with a particle diameter of not larger than 5 μm of an oxide or carbonate salt of elements added, and a quartz powder with a particle diameter of 100 μm were well mixed together. The mixture was melted in an electrical melting furnace to obtain silica glass.

The characteristics of the silica glass were evaluated by the following methods.

(1) Concentration of Added Elements

The concentration of added elements in the silica glass was measured by a fluorescent X-ray spectrometric method. The concentration of the added elements were expressed by atomic % based on the amount of total metal elements.

An atomic ratio [Al/(M)] of aluminum to element (M) was also shown in the tables.

(2) X-Ray Diffraction Analysis (XRD)

The silica glass was pulverized and X-ray diffraction analysis (XRD) was conducted.

The results of X-ray diffraction analysis (XRD) were expressed by the following three ratings.

A: Diffraction pattern showed amorphous state.
B: Peak showing crystalline state occurred, but it was minor.
C: Peak showing crystalline state occurred.

(3) Optical Transmittance (%, cm⁻¹)

The silica glass was cut and both surfaces of the cut glass were abraded to prepare a specimen having a thickness of 10 mm. Optical transmittance was measured by spectrophotometric analysis upon irradiation of the specimen with light having a wavelength of 400–700 nm. The optical transmittance was expressed by the minimum transmittance value.

(4) Properties of Glass

Transparency and appearance were evaluated by visual examination.

The evaluation results were expressed by the following four ratings.

A: Transparent, and substantially free from bubbles having a diameter of at least 0.5 mm and cracks inside the silica glass.
B: Translucent, and contains minor amounts of bubbles having a diameter of at least 0.5 mm and cracks inside the silica glass.
C: Translucent, and contains relatively large amounts of bubbles having a diameter of at least 0.5 mm and cracks inside the silica glass.
D: Opaque (5) Relative Etching Rate A slide glass sample was cut from the silica glass, and it was mirror-polished. The polished surface was partially masked, and the polished specimen was placed on an electrode of a parallel flat sheet etching apparatus (DEM-451 available from Anelva Co.). Plasma etching was carried out by using a mixed gas of $CF_4/O_2/Ar$ at 300W for 4 hours. A mask was removed from the specimen, and the rate of etching of the specimen was determined by measuring the height difference between the masked region (i.e. non-etched region) and the etched region by a surface roughness meter.

The etching rate was expressed as a relative value as the rate of etching of silica glass having no element added being 1. Note, the rate of etching of sample No. 1 (silica glass having no element added) was 6.09 μm/hr.

The evaluation results are shown in Tables 1-1, 1-2, 1-3, 1-4, 2-1, 2-2, 2-3, 2-4, 3-1 and 3-2. Silica glass samples having added elements (M) selected from group 2A elements of the periodic table are shown in Tables 1-1, 1-2, 1-3 and 1-4. Silica glass samples having added elements (M) selected from group 3A elements of the periodic table are shown in Tables 2-1, 2-2, 2-3 and 2-4. Silica glass samples having added elements (M) selected from group 4A elements of the periodic table are shown in Tables 3-1 and 3-2.

TABLE 1-1

| Sample No. | Silica glass | Atomic % based on total metal element | | | Atomic ratio Al/Mg | XRD Amorphous | Transmittance % (cm⁻¹) | Properties of glass | Relative etching rate** |
|---|---|---|---|---|---|---|---|---|---|
| | | Si | Al | Mg | | | | | |
| *1 | Element not added | 100.0 | 0.0 | 0.0 | — | A | 90 | A | 1.00 |
| *2 | Al added | 97.8 | 2.2 | 0.0 | — | A | 80 | A | 0.92 |
| *3 | Al added | 89.0 | 11.0 | 0.0 | — | A | 50 | B Translucent | 0.70 |
| *4 | Al added | 82.7 | 17.3 | 0.0 | — | C | 30 | B Translucent | 0.52 |
| *5 | Al added | 78.4 | 21.6 | 0.0 | — | C | 10 | C Translucent | 0.48 |
| *6 | Al added | 70.2 | 29.8 | 0.0 | — | C | 0 | D Opaque | 0.43 |
| *7 | Mg added | 97.6 | 0.0 | 2.4 | — | A | 5 | D White, turbid | 0.98 |
| *8 | Mg added | 95.1 | 0.0 | 4.9 | — | A | 0 | D White, turbid | 0.91 |
| *9 | Mg added | 88.1 | 0.0 | 11.9 | — | B | 0 | D White, turbid | 0.78 |
| 10 | Al—Mg added | 97.7 | 1.1 | 1.2 | 0.9 | A | 50 | B Transparent, but white spots occurred | 0.81 |

TABLE 1-1-continued

| Sample No. | Silica glass | Atomic % based on total metal element | | | Atomic ratio | XRD Amorphous | Transmittance | Properties of glass | Relative etching rate** |
|---|---|---|---|---|---|---|---|---|---|
| | | Si | Al | Mg | Al/Mg | | % (cm$^{-1}$) | | |
| 11 | Al—Mg added | 96.7 | 2.2 | 1.1 | 2.0 | A | 50 | B Transparent, but white spots and cracks occurred | 0.81 |
| 12 | Al—Mg added | 88.8 | 7.5 | 3.7 | 2.0 | A | 30 | B Transparent, but cracks occurred | 0.45 |
| 13 | Al—Mg added | 88.6 | 5.7 | 5.7 | 1.0 | A | 30 | C Transparent, but white turbid and spotty | 0.45 |
| 14 | Al—Mg added | 88.6 | 5.4 | 6.0 | 0.9 | A | 20 | C Transparent, but white turbid and spotty | 0.43 |

*1 through *9: Comparative Examples
**Etching rate of silica glass having no element added = 1

TABLE 1-2

| Sample No. | Silica glass | Atomic % based on total metal element | | | Atomic ratio | XRD Amorphous | Transmittance | Properties of glass | Relative etching rate** |
|---|---|---|---|---|---|---|---|---|---|
| | | Si | Al | Mg | Al/Mg | | % (cm$^{-1}$) | | |
| 15 | Al—Mg added | 82.5 | 15.3 | 2.2 | 6.8 | A | 20 | B Transparent, but cracks occurred | 0.41 |
| 16 | Al—Mg added | 82.5 | 11.8 | 5.9 | 2.0 | A | 20 | B Transparent, but cracks occurred | 0.34 |
| 17 | Al—Mg added | 82.0 | 9.0 | 9.0 | 1.0 | C | 5 | D White, turbid | 0.26 |
| 18 | Al—Mg added | 74.9 | 20.3 | 4.8 | 4.2 | A | 60 | C Transparent, but cracks and bubbles formed | 0.26 |
| 19 | Al—Mg added | 74.7 | 16.9 | 8.4 | 2.0 | A | 70 | B Transparent, but cracks occurred | 0.18 |
| 20 | Al—Mg added | 74.5 | 12.8 | 12.8 | 1.0 | C | 0 | D | 0.11 |
| 21 | Al—Mg added | 65.9 | 26.2 | 7.9 | 3.3 | A | 85 | A | 0.17 |
| 22 | Al—Mg added | 65.8 | 22.8 | 11.4 | 2.0 | A | 85 | A | 0.13 |
| 23 | Al—Mg added | 65.6 | 17.2 | 17.2 | 1.0 | C | 0 | D | 0.13 |
| 24 | Al—Mg added | 54.3 | 33.9 | 11.8 | 2.9 | C | 20 | C | 0.13 |
| 25 | Al—Mg added | 54.2 | 30.5 | 15.3 | 2.0 | C | 10 | D | 0.09 |
| 26 | Al—Mg added | 54.2 | 27.6 | 18.2 | 1.5 | A | 85 | A | 0.08 |
| 27 | Al—Mg added | 54.2 | 22.9 | 22.9 | 1.0 | A | 85 | A | 0.05 |
| 28 | Al—Mg added | 46.8 | 31.9 | 21.3 | 1.5 | A | 85 | A | 0.11 |
| 29 | Al—Mg added | 46.8 | 26.6 | 26.6 | 1.0 | A | 85 | A | 0.09 |
| 30 | Al—Mg added | 46.9 | 17.7 | 35.4 | 0.5 | C | 0 | D | 0.05 |
| 31 | Al—Mg added | 39.7 | 40.2 | 20.1 | 2.0 | C | 0 | D | 0.06 |

**Etching rate of silica glass having no element added = 1

TABLE 1-3

| Sample No. | Silica glass | Atomic % based on total metal element | | | Atomic ratio | XRD Amorphous | Transmittance | Properties of glass | Relative etching rate** |
|---|---|---|---|---|---|---|---|---|---|
| | | Si | Al | Sr | Al/Sr | | % (cm$^{-1}$) | | |
| 32 | Al—Sr added | 89.7 | 6.9 | 3.4 | 2.0 | A | 20 | C Translucent | 0.44 |
| 33 | Al—Sr added | 55.8 | 16.6 | 27.6 | 0.6 | A | 90 | A | 0.04 |

**Etching rate of silica glass having no element added = 1

TABLE 1-4

| Sample No. | Silica glass | Atomic % based on total metal element | | | Atomic ratio | XRD Amorphous | Transmittance | Properties | Relative etching rate** |
|---|---|---|---|---|---|---|---|---|---|
| | | Si | Al | Ba | Al/Ba | | % (cm$^{-1}$) | of glass | |
| 34 | Al—Ba added | 92.2 | 5.2 | 2.6 | 2.0 | A | 20 | C Translucent | 0.56 |
| *35 | α-alumina | 100 | 0 | 100 | — | — | 0 | D | 0.19 |

*35: COmparative Example
**Etching rate of silica glass having no element added = 1

As seen from Tables 1-1, 1-2, 1-3 and 1-4, some compositions (sample No. 19–31 and 33) exhibited a plasma resistance which was higher than that of α-alumina ceramic (sintered body, sample No. 35) which is known as having very high resistance to fluorine plasma and other plasmas.

As for the evaluation for XRD, the samples assigned with rating C are not preferable in view of the fact that they have a poor dusting property. However, crystalline particles contained in these samples are very minute and thus the problem of dusting is very minor, as compared with the problem of grain boundary as observed in plasma-resistant ceramic members.

As for the transparency of glass, it will be seen that, when element (M) selected from group 2A elements of the periodic table is added alone, the resulting glass is opaque. In contrast, when element (M) selected from group 2A elements of the periodic table is added in combination with aluminum, transparent glass is obtained with a broad range of compositions. Further, when the sum of the amounts of aluminum and element (M) selected from group 2A elements of the periodic table is at least 30 atomic %, good glass having neither cracks nor bubbles is obtained.

Figure 2:
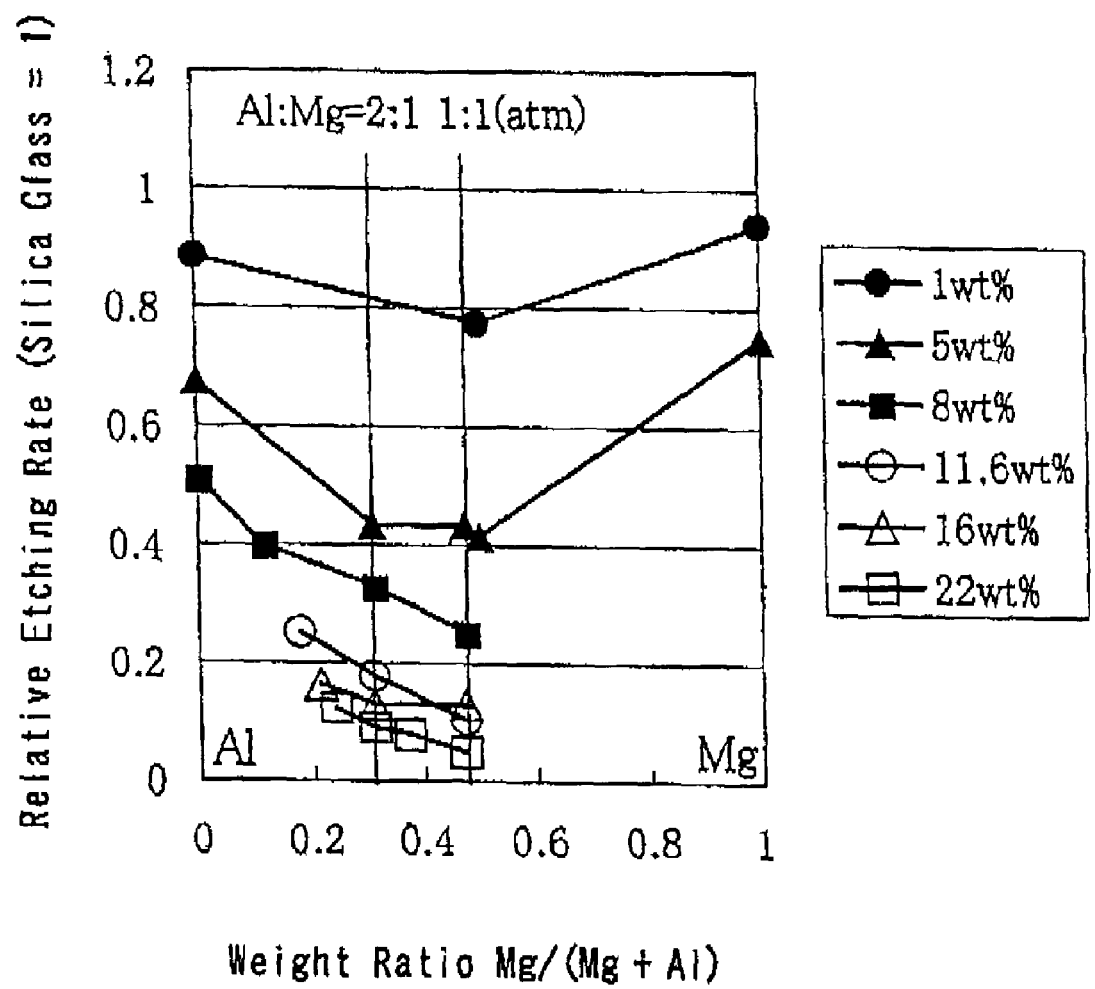
FIG. 2 is a graph showing a relationship of the atomic ratio of Mg to Al [Mg/(Al+Mg)] provided that the total amount of added elements (Al+Mg) is constant and the ratio of Al to Mg is varied, with a relative etching rate of added element-containing silica glass as expressed as the etching rate of silica glass is 1.

The results in Tables 1-1, 1-2, 1-3 and 1-4 are illustrated in FIG. 1 and FIG. 2.

FIG. 1 is a graph showing a relationship between the total amount of aluminum and element (M) [Al+(M)] (atomic %; ordinate) and a relative etching rate (abscissa) of added element-containing silica glass as expressed as the etching rate of silica glass is 1.

The symbols used have the following meanings.
♦: addition of Al
■: addition of Mg
▲: atomic ratio of Al to Mg is 1/1
●: atomic ratio of Al to Mg is 2/1
‡: atomic ratio of Al to Sr is 2/1
×: atomic ratio of Al to Sr is 0.6/1
†: atomic ratio of Al to Ba is 2/1
... □ ..., ... Δ ..., ... ○ ... and ... ◊ ... indicate that crystalline peaks occurred at the X-ray diffraction measurement.

As seen from FIG. 1, relative etching rate of silica glass decreases with an increase of the total amount of added elements, The extent to which the relative etching rate decreases as in the case of the addition of Al plus Mg was larger than that as in the case of the addition of Al or Mg alone. When Al or Mg was added alone, a large amount of the added elements could not be added while the amorphous state was maintained, whereas, Al and Mg were added in combination, even when the total amount of addition exceeded 16 atomic %, the amorphous state could be maintained. Thus, the highly durable silica glass of the invention is characterized as having amorphous state (i.e., minor amount of particles) and reduced rate of etching (i.e., high resistance to plasma) in contrast to the conventional ceramics and silica glass having a single element added therein The beneficial effects could be obtained similarly when each of Mg, Sr and Ba was added in combination with Al. Similar results can be obtained by the addition of Al with any element selected from group 2A elements of the periodic table.

FIG. 2 is a graph showing a relationship of the atomic ratio of Mg to Al [Mg/(Al+Mg)] (abscissa) provided that the total amount of added elements (Al+Mg) is constant and the ratio of Al to Mg is varied, with a relative etching rate (ordinate) of added element-containing silica glass as expressed as the etching rate of silica glass (sample No. 1) is 1.

The symbols used have the following meanings.
●: amount added is 1% by weight
▲: amount added is 5% by weight
■: amount added is 8% by weight
○: amount added is 11.6% by weight
Δ: amount added is 16% by weight
□: amount added is 22% by weight As seen from FIG. 2, the resistance to plasma is enhanced by the addition of Al combined with Mg, as compared with the case when Al or Mg is added alone.

TABLE 2-1

| Sample No. | Silica glass | Atomic % based on total metal element | | | Atomic ratio | XRD Amorphous | Transmittance % (cm$^{-1}$) | Properties of glass | Relative etching rate** |
|---|---|---|---|---|---|---|---|---|---|
| | | Si | Al | Y | Al/Y | | | | |
| *1 | Element not added | 100.0 | 0.0 | 0.0 | — | A | 90 | A Transparent | 1.00 |
| *2 | Al added | 97.8 | 2.2 | 0.0 | — | A | 80 | A Transparent | 0.92 |
| *3 | Al added | 89.0 | 11.0 | 0.0 | — | A | 50 | B Translucent | 0.70 |
| *4 | Al added | 82.7 | 17.3 | 0.0 | — | C | 30 | B Translucent | 0.52 |
| *5 | Al added | 78.4 | 21.6 | 0.0 | — | C | 10 | C Translucent | 0.48 |
| *6 | Al added | 70.2 | 29.8 | 0.0 | — | C | 0 | D Opaq | 0.43 |
| *36 | Y added | 99.3 | 0.0 | 0.7 | 0.0 | A | 10 | D White, turbid | 1.12 |
| *37 | Y added | 96.5 | 0.0 | 3.5 | 0.0 | B | 0 | D White, turbid | 0.82 |
| 38 | Al—Y added | 94.0 | 4.5 | 1.5 | 3.0 | A | 10 | C Translucent | 0.44 |
| 39 | Al—Y added | 87.2 | 11.1 | 1.7 | 6.6 | A | 20 | C Transparent, but white spots occurred | 0.43 |
| 40 | Al—Y added | 84.9 | 11.3 | 3.8 | 3.0 | A | 20 | C Transparent, but white turbid spots and bubbles occurred | 0.27 |
| 41 | Al—Y added | 79.7 | 15.2 | 5.1 | 3.0 | A | 60 | C Bubbles formed | 0.18 |
| 42 | Al—Y added | 50 | 33.3 | 16.7 | 2.0 | A | 85 | A Transparent | 0.07 |

*1 through *6, *36 and *37: Comparative Examples
**Etching rate of silica glass having no element added = 1

TABLE 2-2

| Sample No. | Silica glass | Atomic % based on total metal element | | | Atomic ratio | XRD Amorphous | Transmittance % (cm$^{-1}$) | Properties of glass | Relative etching rate** |
|---|---|---|---|---|---|---|---|---|---|
| | | Si | Al | La | Al/La | | | | |
| *43 | La added | 99.6 | 0.0 | 0.4 | 0.0 | A | 10 | D White, turbid | 1.06 |
| *44 | La added | 93.9 | 0.0 | 6.1 | 0.0 | B | 0 | D White, turbid | 0.95 |
| *45 | La added | 68.2 | 0.0 | 31.8 | 0.0 | C | 0 | D White, turbid bubbles formed | — |
| 46 | Al—La added | 94.0 | 4.5 | 1.5 | 3.0 | A | 50 | C Translucent | 0.49 |
| 47 | Al—La added | 87.8 | 11.2 | 1.1 | 10.3 | A | 60 | C Transparent, but white spots occurred | 0.52 |
| 48 | Al—La added | 84.4 | 11.7 | 3.9 | 3.0 | A | 60 | B Transparent, but cracks and bubbles formed | 0.29 |
| 49 | Al—La added | 78.4 | 16.2 | 5.4 | 3.0 | A | 60 | B Transparent, but cracks and bubbles formed | 0.21 |
| 50 | Al—La added | 68.2 | 15.9 | 15.9 | 1.0 | A | 0 | D White, turbid | 0.14 |
| 51 | Al—La added | 68.2 | 23.9 | 7.9 | 3.0 | A | 60 | B Transparent, but bubbles formed | 0.16 |
| 52 | Al—La added | 61.0 | 26.0 | 13.0 | 2.0 | A | 20 | C Partially white turbid | 0.15 |
| 53 | Al—La added | 61.0 | 29.2 | 9.8 | 3.0 | A | 85 | A Transparent | 0.16 |
| 54 | Al—La added | 43.0 | 19.0 | 38.0 | 0.5 | C | 0 | D Opaque | — |
| 55 | Al—La added | 43.0 | 28.5 | 28.5 | 1.0 | A | 85 | A Transparent | 0.08 |
| 56 | Al—La added | 43.0 | 42.7 | 14.3 | 3.0 | A | 85 | A Transparent | 0.11 |
| 57 | Al—La added | 43.0 | 48.8 | 8.2 | 6.0 | A | 85 | A Transparent | 0.15 |

*43–*45: Comparative Examples, **Etching rate of silica glass having no element added = 1

TABLE 2-3

| Sample No. | Silica glass | Atomic % based on total metal element | | | Atomic ratio | XRD Amorphous | Transmittance % (cm$^{-1}$) | Properties of glass | Relative etching rate** |
|---|---|---|---|---|---|---|---|---|---|
| | | Si | Al | Ce | Al/Ce | | | | |
| *58 | Ce added | 99.6 | 0.0 | 0.4 | 0.0 | A | 10 | D White turbid | 0.90 |
| *59 | Ce added | 97.8 | 0.0 | 2.2 | 0.0 | B | 0 | D White turbid | 0.90 |
| 60 | Al—Ce added | 93.9 | 4.5 | 1.5 | 3.0 | A | 20 | B Transparent | 0.46 |
| 61 | Al—Ce added | 87.8 | 11.2 | 1.1 | 10.3 | A | 50 | C Transparent, but white spots occurred | 0.41 |
| 62 | Al—Ce added | 84.3 | 11.7 | 3.9 | 3.0 | A | 60 | B Transparent, but cracks and bubbles occurred | 0.25 |

*58, *59 Comparative Examples, **Etching rate of silica glass having no element added = 1

TABLE 2-4

| Sample No. | Silica glass | Atomic % based on total metal element | | | | XRD Amorphous | Transmittance % (cm$^{-1}$) | Properties of glass | Relative etching rate** |
|---|---|---|---|---|---|---|---|---|---|
| | | Si | Al | La | Ce | | | | |
| 63 | Al—La—Ce added | 43.0 | 42.8 | 7.1 | 7.1 | A | 85 | A Transparent | 0.11 |
| *35 | α-alumina (sintered body) | 0.0 | 100.0 | 0.0 | 0.0 | C | 0 | D Opaque | 0.19 |

*35: Comparative Examples; **Etching rate of silica glass having no element added = 1

As seen from Tables 2-1, 2-2, 2-3 and 2-4, some compositions (sample No. 41, 42, 50-57 and 63) exhibited a plasma resistance which was higher than that of a-alumina ceramic (sintered body, sample No. 35) which is known as having very high resistance to fluorine-containing plasma and other plasmas.

As for the transparency of glass, it will be seen that, when element (M) selected from group 3A elements of the periodic table is added alone, the resulting glass is opaque. In contrast, when element (M) selected from group 3A elements of the periodic table is added in combination with aluminum, transparent glass is obtained with a broad range of compositions. Further, when the sum of the amount of aluminum and the amount of element (M) selected from group 3A elements of the periodic table is at least 40 atomic %, good glass having neither cracks nor bubbles is obtained.

Al—La added silica glass of sample No. 56 was dissolved in an acid and the contents of impurities contained in trace amounts were measured by an ICP-Mass analysis method. Analysis of the content of each metal of Na, K, Ti, Cr, Fe and Cu in the silica glass of sample No. 56 revealed that each metal content was below 1 ppm.

Figure 3:
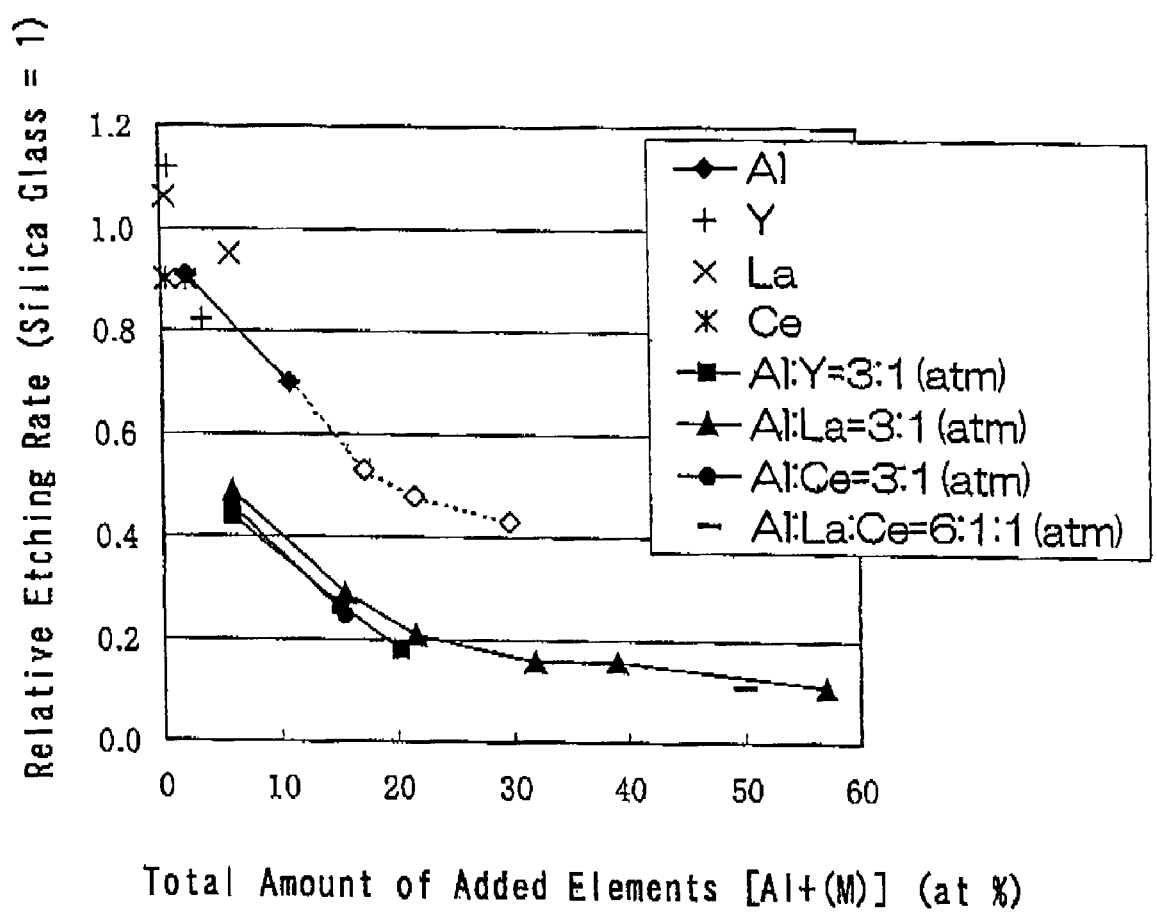
FIG. 3 is a graph showing a relationship between the total amount of aluminum and element (M) [Al+(M)] and a relative etching rate of added element-containing silica glass as expressed as the etching rate of silica glass is 1.
Figure 4:
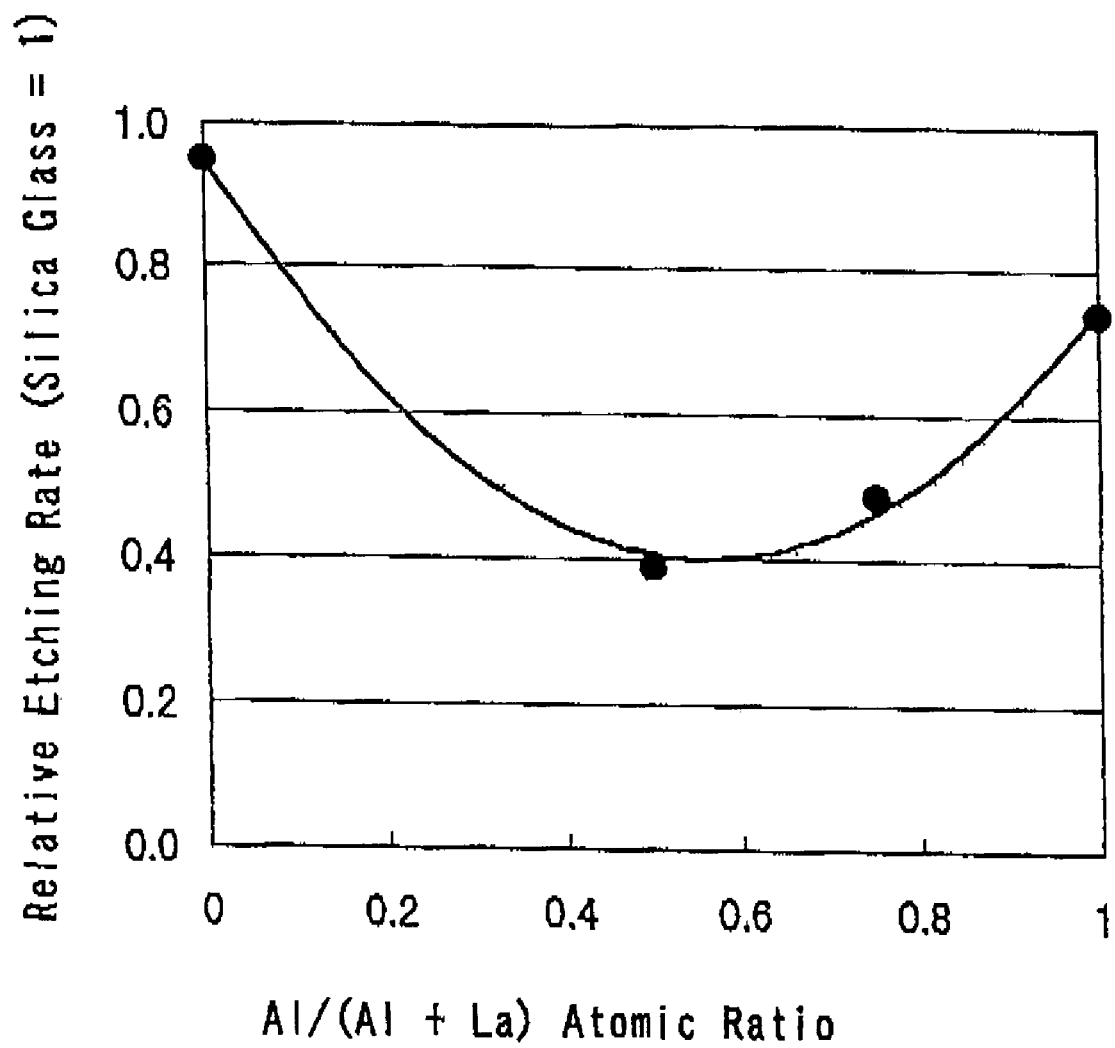
FIG. 4 is a graph showing a relationship of the atomic ratio of Al to La [Al/(Al+La)] provided that the total amount of added elements (Al+La) is constant (6 atomic %), with a relative etching rate of added element-containing silica glass as expressed as the etching rate of silica glass is 1.

The results in Tables 2-1, 2-2, 2-3 and 2-4 are illustrated in FIG. 3 and FIG. 4.

FIG. 3 is a graph showing a relationship between the total amount of aluminum and element (M) [Al+(M)] (atomic %; ordinate) and a relative etching rate (abscissa) of added element-containing silica glass as expressed as the etching rate of silica glass is 1.

The symbols used have the following meanings.
♦: addition of Al
†: addition of Y
×: addition of La
‡: addition of Ce
■: atomic ratio of Al to Y is 3/1
▲: atomic ratio of Al to La is 3/1
●: atomic ratio of Al to Ce is 3/1
-: atomic ratio of Al/La/Ce is 6/1/1
... ◊ ...: indicates that crystalline peaks occurred at the X-ray diffraction measurement.

As seen from FIG. 3, relative etching rate of silica glass decreases with an increase of the total amount of added elements. The extent to which the relative etching rate decreases as in the case of the addition of Al plus Y, La or Ce was larger than that as in the case of the addition of Al or Y or La or Ce alone. The plasma-resistant effect was obtained to a similar extent when each of Y, La and Ce was added in combination with Al. Similar results can be obtained by the addition of Al with any element selected from group 3A elements of the periodic table.

FIG. 4 is a graph showing a relationship of the atomic ratio of Al to La [Al/(Al+La)] (abscissa) provided that the total amount of added elements (Al+La) is constant (6 atomic %) and the ratio of Al to La is varied, with a relative etching rate (ordinate) of added element-containing silica glass as expressed as the etching rate of silica glass (sample No. 1) is 1.

As seen from FIG. 4, the resistance to plasma is enhanced by the addition of Al combined with La, as compared with the case when Al or La is added alone.

TABLE 3-1

| Sample No. | Silica glass | Atomic % based on total metal element | | | Atomic ratio | XRD Amorphous | Relative etching rate** |
|---|---|---|---|---|---|---|---|
| | | Si | Al | Ti | Al/Ti | | |
| *1 | Element not added | 100.0 | 0.0 | 0.0 | — | A | 1.00 |
| *2 | Al added | 98.7 | 2.2 | 0.0 | — | A | 0.92 |
| *3 | Al added | 89.0 | 11.0 | 0.0 | — | A | 0.70 |
| *4 | Al added | 82.7 | 17.3 | 0.0 | — | C | 0.52 |
| *5 | Al added | 78.4 | 21.6 | 0.0 | — | C | 0.48 |
| *6 | Al added | 70.2 | 29.8 | 0.0 | — | C | 0.43 |
| 64 | Al—Ti added | 77.5 | 11.4 | 11.1 | 1.0 | C | 0.37 |

*1 through *6: Comparative Examples
**Etching rate of silica glass having no element added = 1

TABLE 3-2

| Sample No. | Silica glass | Atomic % based on total metal element | | | Atomic ratio | XRD Amorphous | Relative etching rate** |
|---|---|---|---|---|---|---|---|
| | | Si | Al | Zr | Al/Zr | | |
| *65 | Zr added | 98.7 | 0.0 | 1.3 | — | C | 1.00 |
| *66 | Zr added | 96.8 | 0.0 | 3.4 | — | C | 0.95 |
| 67 | Al—Zr added | 94.4 | 4.5 | 1.1 | 4.0 | A | 0.65 |
| 68 | Al—Zr added | 85.9 | 11.3 | 2.8 | 4.0 | C | 0.47 |
| 69 | Al—Zr added | 77.3 | 18.2 | 4.5 | 4.0 | A | 0.48 |
| 70 | Al—Zr added | 97.4 | 2.2 | 0.4 | 6.0 | A | 0.91 |
| 71 | Al—Zr added | 94.8 | 4.5 | 0.7 | 6.0 | A | 0.79 |

*65, *66: Comparative Examples
**Etching rate of silica glass having no element added = 1

Figure 5:
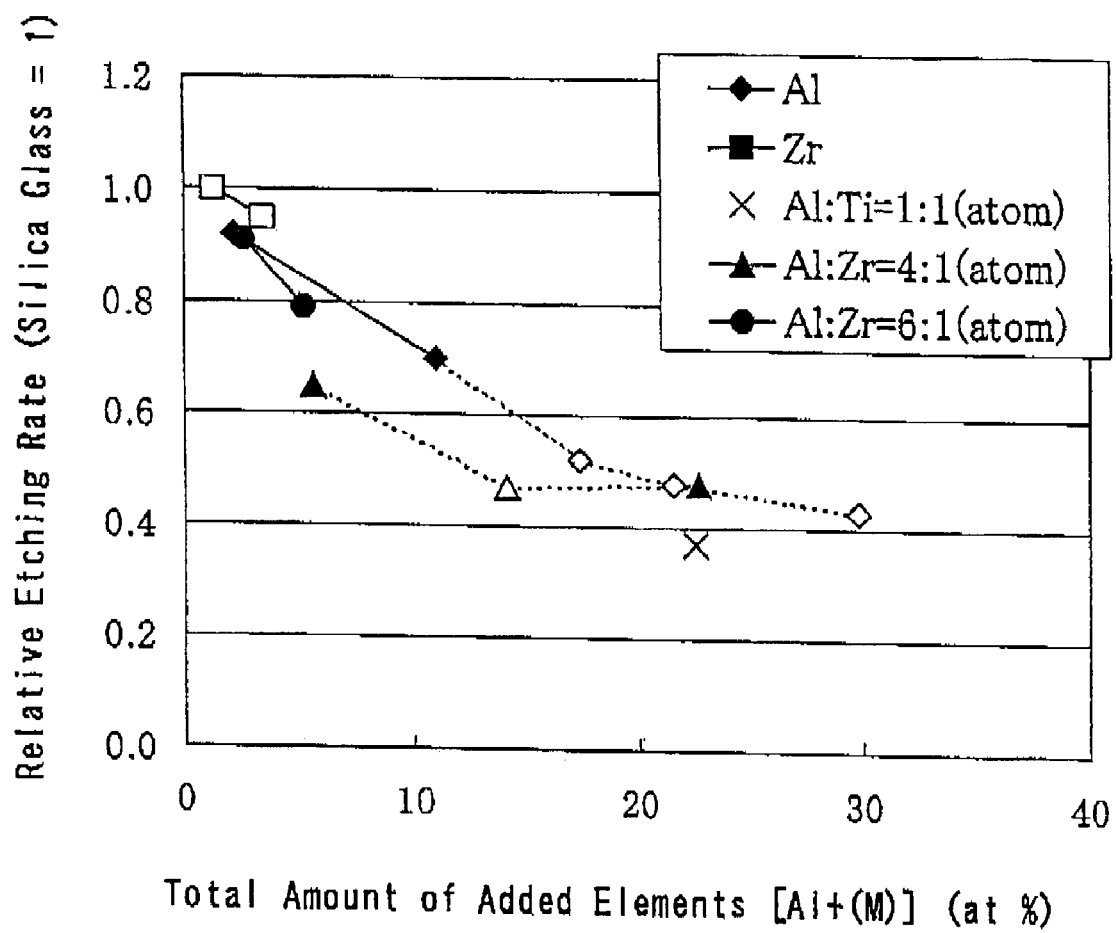
FIG. 5 is a graph showing a relationship between the total amount of aluminum and element (M) [Al+(M)] and a relative etching rate of added element-containing silica glass as expressed as the etching rate of silica glass is 1.

The results in Tables 3-1 and 3-2 are illustrated in FIG. 5.

FIG. 5 is a graph showing a relationship between the total amount of aluminum and element (M) [Al+(M)] (atomic %; ordinate) and a relative etching rate (abscissa) of added element-containing silica glass as expressed as the etching rate of, silica glass is 1.

The symbols used have the following meanings.
♦: addition of Al
■: addition of Zr
×: atomia ratio of Al to Ti is 1/1
▲: atomic ratio of Al to Zr is 4/1
●: atomic ratio of Al to Zr is 6/1
...□..., ...Δ... and ...◊... indicate that crystalline peaks occurred at the X-ray diffraction measurement.

As seen from FIG. 5, the resistance to plasma is enhanced by the addition of Al combined with Ti while an amorphous state is maintained, as compared with the case when Al or Ti is added alone.

Figure 6:
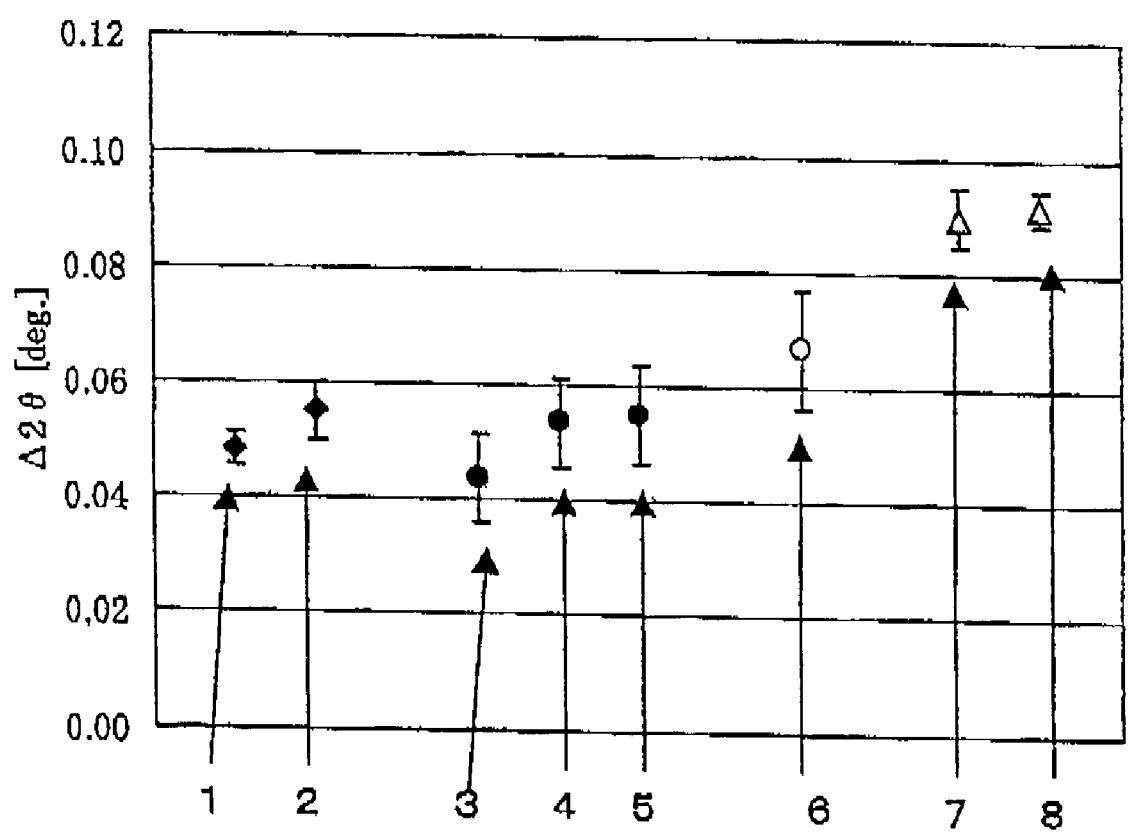
FIG. 6 is a graph showing chemical shifts ($\Delta 2\theta$) at peaks of Al—K$\alpha$ ray emitted from various Al-containing oxides.

FIG. 6 is a graph showing chemical shifts (Δ2θ) (ordinate) at peaks of Al—Kα ray emitted from various Al-containing oxides, provided that peak of Al—Kα ray emitted from Al metal is zero [deg.]. Rh was used as the X-ray source. Each segment of a line in the ordinate direction means a standard deviation of the measured value (number of measurements 3).

The numerals indicate the following samples.
1: $CaAl_2O_4$ (β-tridymite type structure)
2: Synthetic zeolite (A-4 type)
3: Sample No. 12
4.: Sample No. 16
5: Sample No. 19
6: Sample No. 3
7: Sintered body of α-$Al_2O_3$ (sample No, 35)
8: Powder of α-$Al_2O_3$ $CaAl_2O_4$ (β-tridymite type structure) and synthetic zeolite (A-4 type) are known as typical oxides having aluminum with coordination number of 4, and α-$Al_2O_3$ is known as a typical oxide having aluminum with coordination number of 6.

As seen from FIG. 6, the magnitude of shifts (Δ2θ) of Al—Kα ray was usually in the range of 0.04 to 0.06 [deg.] at an Al coordination number of 4, although measurement inaccuracy was found to a minor extent. The magnitude of shifts (Δ2θ) of Al—Kα ray was usually in the range of 0.08 to 0.10 [deg.] at an Al coordination number of 6.

The magnitude of shift (Δ2θ) of Al—Kα ray in Al-added silica glass (sample No. 3, comparative example, only Al was added) was about 0.07 [deg.]. This means that an Al atom with coordination number of 6 not constituting the $SiO_2$ network is present in addition to an Al atom with coordination number of 4 constituting the $SiO_2$ network. In contrast, the magnitude of shift (Δ2θ) of Al—Kα ray in Al—Mg added silica glass (sample No. 12, 16 and 19) was in the range of about 0.04 to about 0.06 [deg.]. This means that almost all Al atoms present have a coordination number of 4.

Example 2

A quartz powder having a purity of 99.99%, an alumina powder having a purity of 99.99% and a lanthanum oxide powder having a purity of 99.99% were weighed and mixed together at a weight ratio of $SiO_2/Al_2O_3/La_2O_3$=35/25/40. After thorough mixing, the mixture was melted in an electrical melting furnace to obtain silica glass.

The silica glass was dissolved in an acid and the contents of impurities contained in trace amounts were measured by an ICP-Mass analysts method. Analysis of the content of each metal of Na, Fe, Cu, Ni, Cr and other metals in the Al—La added silica glass revealed that each metal content was below 1 ppm.

A shadow ring was prepared from the Al—La added silica glass. The shadow ring was fitted to an etching apparatus. After a dummy run was conducted for several hours, silicon wafers were placed in the apparatus and etching was carried out for 30 seconds. The amounts of impurities transferred onto the wafers during etching were measured. The measurement revealed that the amounts of impurities were Na=$10^{10}$ atoms/cm$^2$, Fe=$10^9$ atoms/cm$^2$ and Cu<$10^9$ atoms/cm$^2$. Thus, the Al—La-added silica glass was suitable for use in a semiconductor production apparatus.

For comparison, Al—La-added silica glass was prepared by the same procedures as mentioned above, wherein No.8 silica sand was used as SiO$_2$ raw material with all other conditions remaining the same. The contents of trace impurities therein were measured by the same ICP-Mass analysis method as mentioned above. Analysis of the content of each metal of Na, Fe and Cu in the Al—La added silica glass revealed that Na=1000 ppm, Fe=2000 ppm and Cu=100 ppm.

A shadow ring was prepared from the Al—La-added silica glass. The shadow ring was fitted to an etching apparatus. After a dummy run was conducted for several hours, silicon wafers were placed in the apparatus and etching was carried out for 30 seconds. The amounts of impurities transferred onto the wafers during etching were measured. The measurement revealed that the amounts of impurities were Na=$10^{13}$ atoms/cm$^2$, Fe=$10^{13}$ atoms/cm$^2$ and Cu=$10^{12}$ atoms/cm$^2$. Thus, the Al—La-added silica glass was not suitable for use in a semiconductor production apparatus.

INDUSTRIAL APPLICABILITY

The highly durable silica glass of the present invention, which comprises silica, aluminum and at least one element (M) selected from group 2A elements, group 3A elements and group 4A elements of the periodic table, has a high purity and exhibits enhanced durability while good processability and machinability and low dusting property inherently possessed by silica glass are maintained.

Therefore, this highly durable silica glass is suitable for use as a member provided in a semiconductor production apparatus and liquid crystal display production apparatus using a halogenated gas and/or its plasma.

What is claimed is:

1. A durable silica glass member provided in a semiconductor production apparatus or a liquid crystal production apparatus, which is exposed to a fluorine-containing gas or a plasma of halogenated gas, comprising a durable silica glass consisting essentially of SiO$_2$, Al$_2$O$_3$ and an oxide of at least one element (M) selected from the group consisting of group 3A elements of the periodic table, wherein said silica glass has an amorphous structure and further has a composition falling within a hexagon formed by drawing lines connecting six points: 70:20:10, 50:20:30, 30:40:30, 30:50:20, 45:50:5 and 70:25:5, in the triangular diagram of three-components Si—Al—M, and wherein said silica glass is free of nitrogen.

2. The durable silica glass member according to claim 1, which has an optical transmittance of at least 80% as measured by irradiating a specimen having a thickness of 10 mm with light having a wavelength of 400 to 700 nm.

3. The durable silica glass member according to claim 1, wherein the aluminum is present substantially in the state as having a coordination number of 4.

4. The durable silica glass member according to claim 1, which exhibits a corrosion rate of not larger than 0.5 as measured in a halogenated gas and its plasma and as expressed as the corrosion rate of silica glass having not incorporated therein aluminum and the element (M) being 1.

5. The durable silica glass member according to claim 1, wherein the content of each of Na, Fe and Cu in the silica glass is not larger than 1 ppm.

6. The durable silica glass member according to claim 1, wherein the element (M) is at least one element selected from the group consisting of Y and La.

7. The durable silica glass member according to claim 1, wherein the element (M) is Ce, or a combination of Ce with La.

8. An apparatus for producing semiconductor, which is provided with a durable silica glass member which is exposed to a fluorine-containing gas or a plasma of halogenated gas, comprising a durable silica glass consisting essentially of SiO$_2$, Al$_2$O$_3$ and an oxide of at least one element (M) selected from the group consisting of group 3A elements of the periodic table, said silica glass having an amorphous structure and further having a composition falling within a hexagon formed by drawing lines connecting six points: 70:20:10, 50:20:30, 30:40:30, 30:50:20, 45:50:5 and 70:25:5, in the triangular diagram of three-components Si—Al—M, and wherein said silica glass is free of nitrogen.

9. An apparatus for producing liquid crystal, which is provided with a durable silica glass member whereas a durable silica glass member provided in a semiconductor production apparatus or a liquid crystal production apparatus, which is exposed to a fluorine-containing gas or a plasma of halogenated gas, comprising a durable silica glass consisting essentially of SiO$_2$, Al$_2$O$_3$ and an oxide of at least one element (M) selected from the group consisting of group 3A elements of the periodic table, said silica glass having an amorphous structure and further having a composition falling within a hexagon formed by drawing lines connecting six points: 70:20:10, 50:20:30, 30:40:30, 30:50:20, 45:50:5 and 70:25:5, in the triangular diagram of three-components Si—Al—M, and wherein said silica glass is free of nitrogen.

* * * * *